United States Patent
Jackson et al.

(10) Patent No.: US 11,386,471 B2
(45) Date of Patent: Jul. 12, 2022

(54) PAY-FOR-ACCESS LEGAL RESEARCH SYSTEM WITH ACCESS TO OPEN WEB CONTENT

(75) Inventors: Peter Jackson, Burnsville, MN (US); Mark A. Bluhm, Cottage Grove, MN (US)

(73) Assignee: THOMSON REUTERS ENTERPRISE CENTRE GMBH, Zug (CH)

( * ) Notice: Subject to any disclaimer, the term of this patent is extended or adjusted under 35 U.S.C. 154(b) by 1877 days.

(21) Appl. No.: 11/422,281

(22) Filed: Jun. 5, 2006

(65) Prior Publication Data

US 2007/0027811 A1     Feb. 1, 2007

Related U.S. Application Data

(60) Provisional application No. 60/687,124, filed on Jun. 3, 2005.

(51) Int. Cl.
| | |
|---|---|
| G06Q 20/00 | (2012.01) |
| G06Q 30/06 | (2012.01) |
| G06Q 30/02 | (2012.01) |
| G06F 16/951 | (2019.01) |

(52) U.S. Cl.
CPC .......... *G06Q 30/06* (2013.01); *G06F 16/951* (2019.01); *G06Q 30/02* (2013.01)

(58) Field of Classification Search
CPC .......... G06Q 2220/00; G06Q 2220/10; G06Q 2220/16; G06Q 30/06; G06Q 30/02; G06F 16/951
USPC ........................................................ 705/52
See application file for complete search history.

(56) References Cited

U.S. PATENT DOCUMENTS

| | | | |
|---|---|---|---|
| 6,792,616 B1 | 9/2004 | Jerding et al. | |
| 7,134,131 B1* | 11/2006 | Hendricks et al. | ............. 725/31 |
| 2002/0091679 A1* | 7/2002 | Wright | .............. G06F 17/30864 |
| 2002/0161680 A1* | 10/2002 | Tarnoff | ............. G06F 17/30864 |
| | | | 705/35 |
| 2002/0188521 A1 | 12/2002 | Kimmel, Jr. | |
| 2003/0195967 A1* | 10/2003 | Selgas | ..................... H04L 29/06 |
| | | | 709/228 |

(Continued)

FOREIGN PATENT DOCUMENTS

WO   WO-2006/133017 A1   12/2006

OTHER PUBLICATIONS

"European Application No. 06772049.0,Office Action dated Nov. 3, 2008", 3 pgs.

(Continued)

*Primary Examiner* — Dante Ravetti
(74) *Attorney, Agent, or Firm* — Duncan Galloway Greenwald PLLC; Kevin T. Duncan

(57) ABSTRACT

To facilitate legal research, companies, such as Thomson West provide subscription-based (pay-for-access) online information-retrieval systems. Seeking to improve these and related systems, the present inventors recognized researchers often need to access open web content that is outside their subscription-based system. Accordingly, the present inventors devised systems, methods, and software that automatically search for and identify open web documents in response to queries within the subscription-based system and/or automatically search for and identify pay-for-access content in response to receiving open web queries.

10 Claims, 4 Drawing Sheets

(56) References Cited

U.S. PATENT DOCUMENTS

2004/0267556 A1\* 12/2004 Larson .................. G06Q 30/00
　　　　　　　　　　　　　　　　　　　　　　　　　705/1.1
2005/0234895 A1\* 10/2005 Kramer .............. G06Q 30/0277
2006/0085741 A1\*  4/2006 Weiner ................. G06F 16/972
　　　　　　　　　　　　　　　　　　　　　　　　　715/205
2006/0149720 A1\*  7/2006 Dehlinger ......................... 707/3

OTHER PUBLICATIONS

"International Search Report for corresponding PCT Application No. PCT/US2006/021589", (dated Oct. 5, 2006), 4 pgs.
Reinke, J. L., "Addressing The Problems Of Performing Online Legal Research As A Fee-Based Service", *Legal Reference Services Quarterly*, vol. 14(1/2), (1994), 141-162.

\* cited by examiner

FIG. 3

PAY-FOR-ACCESS LEGAL RESEARCH SYSTEM WITH ACCESS TO OPEN WEB CONTENT

CROSS-REFERENCE TO RELATED APPLICATIONS

This application claims priority to U.S. provisional application 60/687,124 filed on Jun. 3, 2005. The provisional application is incorporated herein by reference.

TECHNICAL FIELD

Various embodiments of the present invention concern information-retrieval systems, such as those that provide legal documents or other related content.

BACKGROUND

Judges and lawyers within the American legal system as well as some other countries around the world are continually researching an ever-expanding body of past opinions, or case law, for the ones most relevant to resolution of disputes. To facilitate these searches, West Publishing Company of St. Paul, Minn. (doing business as Thomson West) collects judicial opinions from courts across the United States, and makes them available electronically through its Westlaw™ pay-for-access research system. (Westlaw is a trademark of Thomson West.)

One problem the present inventors recognized with the highly successful Westlaw system is that their users also access open web content, such as blogs and law-firm websites, that is relevant to their work. However, accessing this open (free) web content conventionally requires users to leave the professionally oriented Westlaw search interface to an advertising-based consumer-oriented public search engine, such as Google.com or Yahoo.com. These public search engines not only lack the power of systems such as Westlaw to effectively organize and present content based on the specific needs of legal professionals, but also manipulate their search results based on advertising interests.

Accordingly, the present inventors have recognized a need to improve the information-retrieval systems for not only legal professionals, but also other types of professionals who use pay-for-access research systems.

SUMMARY

To address this and/or other needs, the present inventors devised, among other things, various systems, methods, and software that facilitate the retrieval of open web content from pay-for-access research systems, such as the Westlaw system. One exemplary pay-for-access system receives a query for legal opinions from a user and returns search results that include pay-for-access and non-pay-for-access content.

In some embodiments, two search engines are used to facilitate the search, with one for a collection of pay-for-access databases and the other for non-pay-for-access (open) databases. Also, in some variants of these embodiments, non-pay-for-access searches are based on the user query in combination with contextual information, such as the identity, professional profile, or a workflow task associated with the user. Moreover, some embodiments display one or more portions of the search results, such as the non-pay-for-access content, in association with advertising based on the query and/or contextual information.

In some embodiments, queries are optionally directed at only open content, and the results presented or displayed in association with one or more suggestions for related pay-for-access content.

BRIEF DESCRIPTION OF DRAWINGS

FIG. 3 is a facsimile of an exemplary graphical user interface 300 corresponding to one or more embodiments of the invention.

DETAILED DESCRIPTION OF EXEMPLARY EMBODIMENTS

This description, which references and incorporates the above-identified Figures, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Information-Retrieval System

Figure 1:
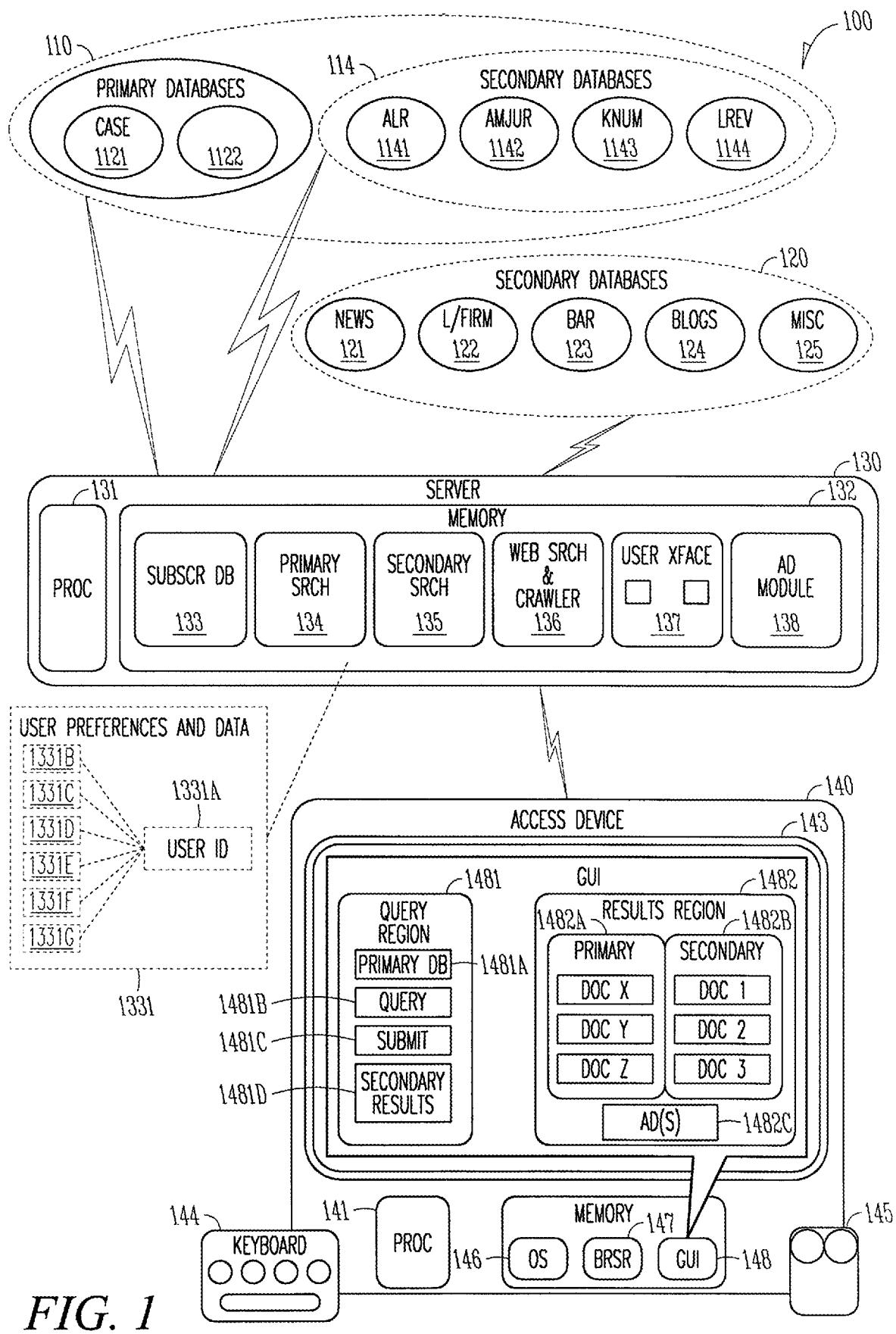
FIG. 1 is a diagram of an exemplary information-retrieval system 100 corresponding to one or more embodiments of the invention.

FIG. 1 shows an exemplary online information-retrieval system 100. System 100 includes one or more pay-for-access databases 110, one or more open (non-pay-for-access) databases (or data sources) 120, one or more servers 130, and one or more access devices 140.

Pay-for-access databases (or data stores) 110 includes a set of primary databases 112 and a set of second databases 114. Primary databases 112, in the exemplary embodiment, include a caselaw database 1121 and a statutes databases 1122, which respectively include judicial opinions and statutes from one or more local, state, federal, and/or international jurisdictions. Secondary databases 114, which contain legal documents of secondary legal authority or more generally authorities subordinate to those offered by judicial or legislative authority in the primary database, includes an ALR (American Law Reports) database, 1141, an AMJUR database 1142, a West Key Number (KNUM) Classification database 1143, and an law review (LREV) database 1144. Other embodiments may include filed court documents, such as briefs, pleadings, deposition transcripts, and so forth. And still other embodiments include non-legal databases that include pay-for-access financial, scientific, or health-care content. Also, in some embodiments, primary and secondary connote the order of presentation of search results or only nominally distinguish one set of databases from the other, and not necessarily the authority or credibility of the search results.

Non-pay-for-access databases 120 include one or more News databases 121, law-firm website databases 122, bar association website databases 123, legal blogs database 124, and miscellaneous databases 125. Exemplary news databases include law.com, cnn.com/law, corpcounsel, legalnewswatch, Americanlawyer, MOMedicalLaw. Exemplary law firm databases include bakerinfo.com, mofo.com, shearman.com, slwk.com, lindquist.com. Exemplary bar-association databases include ABAnet.org, mnbar.org, lawschool/cornell.edu, jurist law.pitt.edu. Blogs databases include MayItPleaseTheCourt, ip-Updates, TheNonbillableHour, myShingle, BenefitsCounsel, CrimLaw, and Circuit2. Miscellaneous databases include FTC.gov and ethics.state.TX.us.

In some embodiments, non-pay-for-access databases include any free, publicly accessible internet content irrespective of its relevance with legal subject matter. In still other embodiments, non-pay-access databases may include URLs for user-selected databases or URLs (Uniform Resource Locators). In some instances, the databases or URLS are provided as a most-recently-accessed list based on monitoring of user clicks or other indicators of usage frequency.

In the exemplary embodiment, databases 110 and 120, which take the exemplary form of one or more electronic, magnetic, or optical data-storage devices, include or are otherwise associated with respective indices (not shown). Each of the indices includes terms and phrases in association with corresponding document addresses, identifiers, and other conventional information. In the exemplary embodiment, the indices include word pairs, such as noun-word pairs and chains of noun-word pairs, to facilitate concept searching. Other embodiments may include conventional keyword indices such as used in Google, Yahoo, or MSN.

Databases 110 and 120 are coupled or couplable via a wireless or wireline communications network, such as a local-, wide-, private-, or virtual-private network, to server 130.

Server 130, which is generally representative of one or more servers for serving data in the form of webpages or other markup language forms with associated applets, ActiveX controls, remote-invocation objects, or other related software and data structures to service clients of various "thicknesses." More particularly, server 130 includes a processor module 131, a memory module 132, a subscriber database 133, a primary search module 134, secondary search module 135, a web search and crawler module 136, and a user-interface module 137.

Processor module 131 includes one or more local or distributed processors, controllers, or virtual machines. In the exemplary embodiment, processor module 131 assumes any convenient or desirable form.

Memory module 132, which takes the exemplary form of one or more electronic, magnetic, or optical data-storage devices, stores subscriber database 133, primary search module 134, secondary search module 135, web search and crawler module 136, and user-interface module 137.

Subscriber database 133 includes subscriber-related data for controlling, administering, and managing pay-as-you-go or subscription-based access of databases 110. In the exemplary embodiment, subscriber database 133 includes one or more preference data structures, of which data structure 1331 is representative. Data structure 1331 includes a customer or user identifier portion 1331A, which is logically associated with one or more data fields, such as data fields 1331B, 1331C, 1331D, 1331E, 1331F, and 1331G.

Data field 1331B includes a default value governing whether supplemental searching is enabled or disabled when searching select databases, such as case-law databases or non-pay-for-access databases. Data field 1331C includes a listing of one or more URLs defining a set of one or more non-pay-for-access databases or data sources. Data field 1331D includes a default value governing presentation of supplemental of secondary search results, for example, the listing priority of various content types or the maximum number of such results to display. Data field 1331E includes a default value governing which among two or more secondary search algorithms or acceptance criteria are used during secondary searching.

Data field 1331F includes one or more values governing the presentation of advertising in search results. For example, in some embodiments, data field 1331F indicates whether a user has enabled the presentation of third-party advertising in association with search results from non-pay-for-access databases or data sources. In others, it may also include or identify a set of one or more advertisers. And in still others, data field 1331F may indicate that advertising may be presented in association with pay-for-access data. In these cases, the user may be compensated for allowing the advertising by receiving a total or partial discount on charges that would otherwise be assessed for accessing the pay-for-access data. Data field 1331G includes professional profile information for the user, such as practice specialty, jurisdictions, educational data, bar admission date, associate-partnership status, estimated or actual income or income range.

Primary search module 134 includes one or more search engines and related user-interface components, for receiving and processing user queries against one or more of the pay-for-access databases 110. In the exemplary embodiment, one or more search engines associated with search module 134 provide Boolean, tf-idf, natural-language search capabilities.

Secondary search module 135 includes one or more search engines for receiving and processing queries against one or more of databases 110. In the exemplary embodiment, secondary search module 135 provides a composite vector-based classification search using a user query and/or results from primary search module 134. In other embodiments, the second database provides topical treatises, state practice guides, statutes, and/or law review articles to augment searches of caselaw database. Also, other embodiments augment statute searches, regulatory searches, secondary-material searches, and news searches. Some embodiments charge a separate or additional fee for accessing documents from the second database.

Web search and crawler module 136 includes one or more search engines and related user-interface components, for indexing content and processing user queries against one or more of the non-pay-for-access databases 120 or more generally any content external to databases. In some embodiments, one or more search engines and crawlers associated with module 136 mirror the capabilities of the primary and/or secondary search modules, providing advanced professional indexing and/or searching capabilities for the open web content. In other embodiments, module 136 includes or accesses the functionality of a generic search engine, such as Google, Yahoo, and MSN.

In still other embodiments, the web crawler portion of the module finds and indexes pages that create a topical slice of the web, for example, harvesting legal, financial, scientific, health-related, educational, or political information. It may be necessary to download large numbers of pages from domains such as .com and .org to create such a slice, by post-processing the pages with a document categorization engine, such as described in copending U.S. patent application Ser. No. 10/027,914 (attorney docket 4962.015U.S. 1; CARE U.S.), which was filed on Dec. 21, 2001, and which is incorporated herein by reference. Or one could begin with a list of user- or administrator-defined URLs, and simply download and filter all pages from these sites. The module further includes a document clustering and named-entity extraction tools. The document clustering tool discovers subtopics in the downloaded material, or simply classifies them to an existing taxonomy using a categorization engine. Named-entity extraction tools, such as those based on GATE, mine proper names from text, listing these in a separate index, and possibly resolving these references against an authority file, such as a directory of persons or companies that may be a part of databases 110 or 120.

User-interface module 137 includes machine readable and/or executable instruction sets for wholly or partly defining web-based user interfaces, such as search interface 1371 and results interface 1372, over a wireless or wireline communications network on one or more accesses devices, such as access device 140.

Ad module 138 include machine readable data and/or executable instructions for incorporating advertising into various displays defined by user-interface module 137. In some embodiments, ad module 138 includes the actual advertising content, whereas in others the advertising content is provided by accessing a remote advertising data store or database based on ad identifiers and/or advertising selection rules and user data followed by the ad module. Exemplary forms of advertising include banner ads and hyperlinks. In some embodiments, the advertising relates to the handling of specialty legal matters, provision of expert witness services, electronic discovery services, forensic services, valuation services, etc.

Access device 140 is generally representative of one or more access devices. In the exemplary embodiment, access device 140 takes the form of a personal computer, workstation, personal digital assistant, mobile telephone, or any other device capable of providing an effective user interface with a server or database. Specifically, access device 140 includes a processor module 141 one or more processors (or processing circuits) 141, a memory 142, a display 143, a keyboard 144, and a graphical pointer or selector 145.

Processor module 141 includes one or more processors, processing circuits, or controllers. In the exemplary embodiment, processor module 141 takes any convenient or desirable form. Coupled to processor module 141 is Memory 142 stores code (machine-readable or executable instructions) for an operating system 146, a browser 147, and a graphical user interface (GUI)148. In the exemplary embodiment, operating system 146 takes the form of a version memory 142. of the Microsoft Windows operating system, and browser 147 takes the form of a version of Microsoft Internet Explorer. Operating system 146 and browser 147 not only receive inputs from keyboard 144 and selector 145, but also support rendering of GUI 148 on display 143. Upon rendering, GUI 148 presents data in association with one or more interactive control features (or user-interface elements). (The exemplary embodiment defines one or more portions of interface 148 using applets or other programmatic objects or structures from server 130.) More specifically, graphical user interface 148 defines or provides one or more display regions, such as a query or search region 1481 and a search-results region 1482. Query region 1481 is defined in memory and upon rendering includes one or more interactive control features (elements or widgets), such as a primary database input 1481A, a query input region 1481B, a query submission button 1481C, and a secondary search enable/disable input 1481D.

Primary database input 1481A, in the exemplary embodiment, takes the form of a pull-down menu which enables the users to select one or more of pay-for-access databases 110 or one or more of non-pay-for-access databases 120. Selection of a pay-for-access database in some embodiments not only defines the selected database(s) as the primary target of the search with results displayed in a primary results region 1482A, but also defines the secondary target as one or more of secondary databases 114 and/or non-pay-for-access databases (or data sources) 120. Conversely, selection of a non-pay-for-access database or data source as the primary target of the search defines the secondary target as one or more of the pay-for-access databases. Some embodiments omit the user selection feature described here and define the primary database to always be a set of one or more non-pay-for-access database, whereas others define it to be a set of one or more pay-for-access databases.

Query input region 1481B receives a user-defined text string as a query, with the query taking the form of Boolean or natural-language query. In some embodiments, query input region provides access to a set of two or more predefined queries, which, for example, may promote development of fundamental knowledge in a particular subject area. Query submission button 1481C when selected causes communication of the query in query input region 1481B to server 130 for processing. Secondary search enable/disable input 1481D provides a user control for enabling or disabling the secondary search capabilities. Default value of input 1481D is determined by user preferences for a given user.

Search-results region 1482 is also defined in memory and upon rendering includes a primary results region 1482A for displaying results found in a primary target of an submitted query, a secondary results region 1482B for displaying results found in a secondary target of the submitted query, and one or more advertising regions 1482C. Region 1482A includes one or more interactive control features, such as features DOC X, DOC Y, DOC Z for accessing or retrieving one or more corresponding primary search result documents from one or more of databases 110 or 120 via server 130. Each control feature includes a respective document identifier or label identifying respective titles and/or citations for the corresponding documents.

Secondary results region 1482B includes one or more interactive control features, such as features DOC 1, DOC 2, DOC 3 for accessing or retrieving one or more corresponding secondary search result documents from one or more of databases 110 via server 120. Each control feature includes a respective document identifier or label identifying respective titles and/or citations for the corresponding documents.

Advertising regions 1482C include one or more set of advertising, which is selected by advertising module 128 based on query, search results, and/or contextual information regarding the user or the query. In some embodiments, the advertising is placed in an exclusive region of the results region such as at its top, bottom, left, right subregions, whereas in other embodiments the advertising is placed exclusively with non-pay-for-access search results, in some cases individual ads intermixed with the search results or placed adjacent to specific results.

In the exemplary embodiment, one of more of these control features takes the form of a hyperlink or other browser-compatible command input, and provides access to and control of query region 1481 and search-results region 1482. User selection of the control features in region 1482 results in retrieval and display of at least a portion of the corresponding document within a region of interface 148 (not shown in this figure.) Although FIG. 1 shows query region 1481 and results region 1482 as being simultaneously displayed, some embodiments present them at separate times based on user selection. Additionally or alternatively, some embodiments intermingle the primary and secondary results within region 1482. Some variants of these embodiments present the secondary results in a font that visibly distinguishes them from the primary results and/or in combination with an icon that indicates them as being secondary or supplemental.

Exemplary Operation

Figure 2:
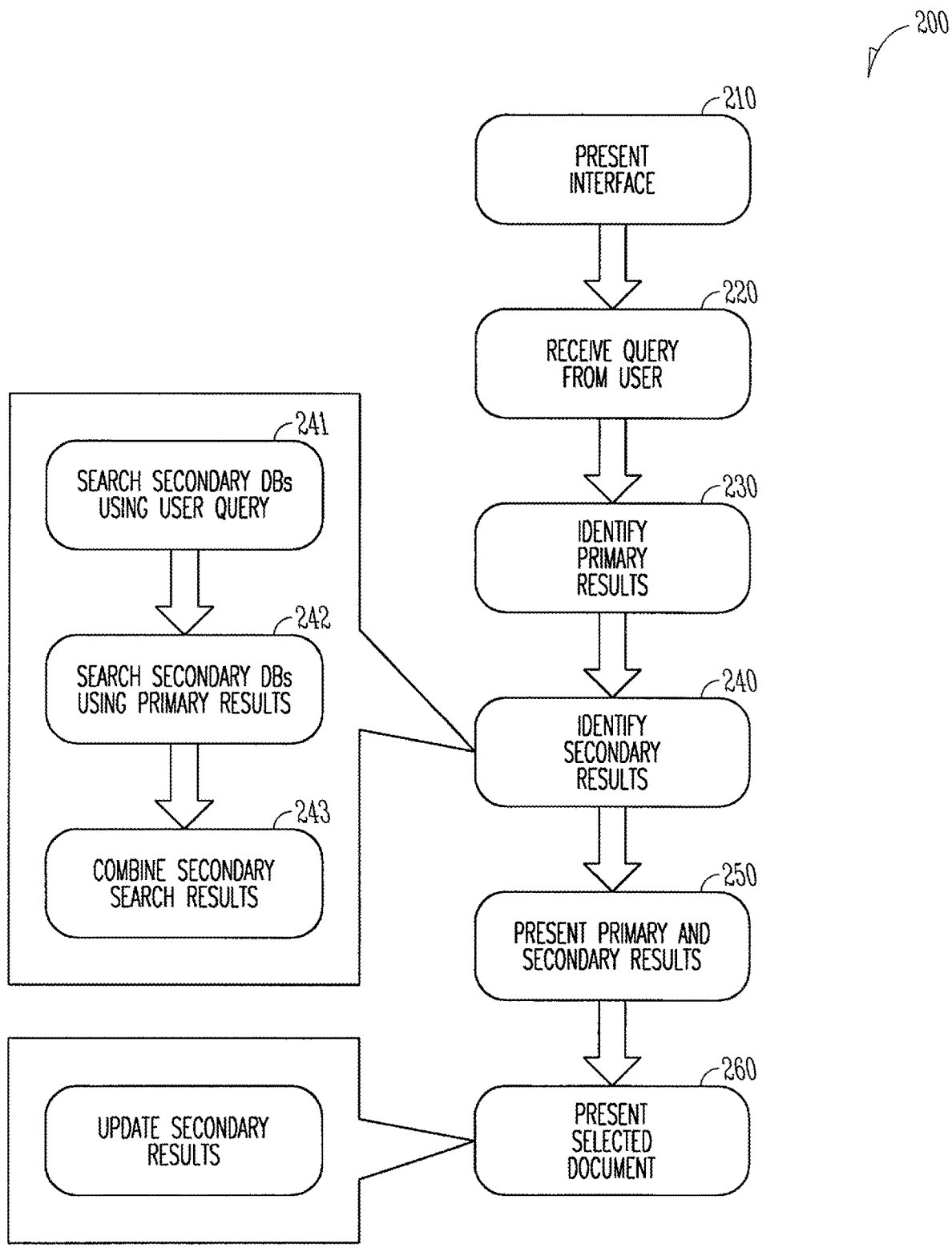
FIG. 2 is a flowchart corresponding to one or more exemplary methods of operating system 100 and one or more embodiments of the invention.

FIG. 2 shows a flow chart 200 of one or more exemplary methods of operating a system, such as system 100. Flow chart 200 includes blocks 210-260, which, like other blocks in this description, are arranged and described in a serial sequence in the exemplary embodiment. However, some embodiments execute two or more blocks in parallel using multiple processors or processor-like devices or a single processor organized as two or more virtual machines or sub processors. Some embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow (in FIG. 2 and elsewhere in this description) applies to software, hardware, firmware, and other desirable implementations.

Block 210 entails presenting a search interface to a user. In the exemplary embodiment, this entails a user directing a browser in an client access device to internet-protocol (IP) address for an online information-retrieval system, such as the Westlaw system and then logging onto the system. Some embodiments may omit an authentication, permitting users to freely access the search interface. Successful login results in a web-based search interface, such as interface 138 in FIG. 1 or interface 300 in FIG. 3 (or one or more portions thereof) being output from server 120, stored in memory 132, and displayed by client access device 130.

Figure 3:
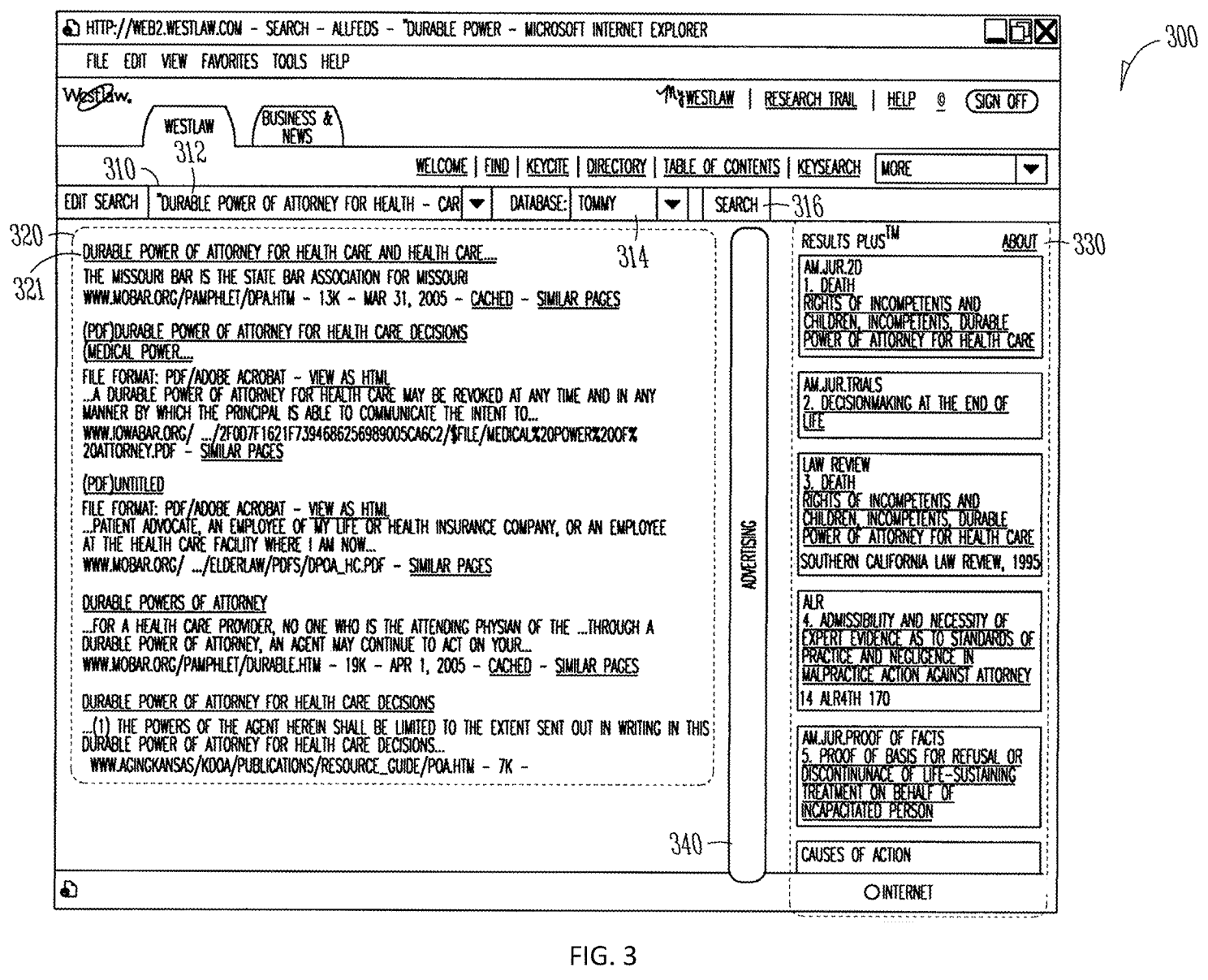

As shown in FIG. 3, interface 300 includes a number of interactive control features, including a query region 310 and a results region 320, which generally parallel the function of regions 1481 and 1482 of FIG. 1. Query region 310 includes, a query input region 312, a query target region 314, and a query-submit command 316. Query input region 312 receives textual input defining a query. Query target region 314 allows the user to define the primary target of the query as pay-for-access or non-pay-for access databases or data sources. Defining a pay-for-access database as the primary target, in the exemplary embodiment, defines the secondary target as one or more of the non-pay-for-access database or data sources. Query-submit command 316 allows a user to cause access device 140 to submit the query defined in input region 312 and the selection defined in query target region 314 to a server, such as server 130.

Using interface 148 or 300, the user can define or submit a query and cause it to be output to a server, such as server 130. In other embodiments, a query may have been defined or selected by a user to automatically execute on a scheduled or event-driven basis. In these cases, the query may already reside in memory of a server for the information-retrieval system, and thus need not be communicated to the server repeatedly. Execution then advances to block 220.

Block 220 entails receipt of a query. In the exemplary embodiment, the query includes a query string and/or a set of primary and secondary target databases, which includes one or more of the select databases. As noted in above, the exemplary embodiment defines the secondary target databases based on the selection of the primary databases. If the primary database is a pay-for-access database, then the secondary databases will include one or more non-pay-for-access databases as defined by user preferences and/or other criteria. And, if the primary database includes non-pay-for-access databases or data sources, the secondary databases will include one or more pay-for-access database or data sources.

In some embodiments, the query string includes a set of terms and/or connectors, and in other embodiment includes a natural-language string. Also, in some embodiments, the set of target databases is defined automatically or by default based on the form of the system or search interface. Also, in some embodiments, the received query may be accompanied by other information, such as information defining whether to the secondary search capability has been enabled or disabled. In any case, execution continues at block 230.

Block 230 entails identifying a set of primary documents or search results based on or in response to the received query. In the exemplary embodiment, this entails the server or components under server control or command, executing the query against the targeted set of databases and identifying documents that satisfy the query criteria. The targeted database determines which search engine or search procedure to follow. Execution proceeds to block 240.

Block 240 entails identifying a set of one or more secondary documents based on the query if the secondary search capability has been enabled. In the exemplary embodiment, secondary identification generally entails using at least a second search engine, such as a multi-classifier text classification engine to search one or more secondary databases, with the pay-for-access or non-pay-for-access character of the databases generally opposite to that of the primary databases.

More specifically, the exemplary embodiment follows the method shown in flow chart 240, which includes process blocks 241-244. Block 241 entails searching the secondary databases based on the user query.

Block 242 entails searching the secondary databases based on results from the first search engine at block 230. In the exemplary embodiment, this search entails extracting text, such as noun-word pairs or chains of noun-word pairs, from a subset of the documents of the primary search results to define a pool or set of features. The extracted text is then input into a text classifier, such as the multi-classifier engine note above, and compared to text of potentially related articles or more generally documents in the secondary databases. Those judged by the multi-classifier engine to be sufficiently similar to the other search results by virtue of meeting a similarity threshold are then included in the secondary search results. In some embodiments, a preset number of the most relevant documents from the primary search results—for example, the top 5 documents or the top 5% of documents—are used as a basis. Also, some embodiments may use a subset of the primary search results as a basis for a "more like this" type of search of the secondary databases. Execution continues at block 243.

Block 243 entails combining the results from the searches of the secondary databases into a secondary results set. In the exemplary embodiment, extended or secondary search results include ALRs, AmJur sections, and West Key Number System classifications codes (and/or associated headnotes) that are determined to be relevant to the query.

In the exemplary embodiment, the topical scope of the secondary databases is focused on legal materials. However, in some embodiments, any relevant domain of information can be searched, including for example, news and financial databases, professional directories, etc. In determining relevance of secondary database documents, some embodiments rely on customer-tracking or usage information in addition to the secondary search engine. This information ensures documents that are frequently used (that is, "clicked on,"), printed, and/or KeyCited after similar searches are more likely to be included within secondary results.

Additionally, some embodiments use term location within a document as a factor in determining the relevance score or ranking of candidate secondary results. Moreover, some embodiments also account for contextual information regarding the query, such as the identity or professional profile of the user. For example, if the professional profile indicates that the user's specialty area differs from the subject matter of the query or that the user has recently been admitted to a given jurisdiction, secondary results that provide more background or jurisdictional (geographic) information may be given greater weight in the ranking or conversely results that do not provide effective background or primer material (as ranked by other users) may be down weighted. Other embodiments may also account for the work task being completed by the user. For example, a user drafting a complaint for a particular jurisdiction could be presented with secondary results that identify sample complaints from winning cases with similar legal issues or fact patterns. Work flow signals or indications may be derived from the query itself or from the entry point into the research system, for example from a plug-in of a word processing program that identifies a given document in process as a complaint. Execution continues at block 250.

Block 250 entails presenting results from primary and secondary databases to the user via a graphical user interface. In the exemplary embodiment, this entails displaying a listing of the secondary results in one or more separate regions, panes, or windows, adjacent to a listing of the primary results, with each listed document or more generally item, associated with a corresponding interactive control feature, such as hyperlink, that is selectable by a user to invoke retrieval and/or display of the associated document (or a portion thereof) in the same or separate window. See, for example, primary and secondary regions 1381 and 1382 in FIG. 1 or primary and secondary regions 320 and 330 in FIG. 3. Additionally, some embodiments present the secondary results in association with one or more advertisements, such as advertising 340.

Also, some embodiments automatically limit the number of secondary items shown in the separate pane to a predetermined number of items, such as 10 or 20. Exemplary findings include links to documents from the American Law Reports (ALR) and American Jurisprudence 2d (AMJUR) databases, and West topic and key number references (not shown in FIG. 3). (Some embodiment also excludes secondary result documents, such as ALR or AmJur documents, that have red KeyCite status flags (indicating that the documents have been superseded)). In addition, primary results that include case law and statutes may include links to treatises and law reviews. Some embodiments include an "expand" control feature which allows users to selectively extend the number and/or size of the displayed secondary results list and thus gain access to an more extended list of secondary results.

Block 260 entails retrieving and presenting one or more of the primary search results. In the exemplary embodiment, this entails a user clicking on one or more of the listed primary search results and thereby causing access device 130 to initiate or submit a request for the one or more items. For example, clicking on listed item 321 (in FIG. 3), a non-pay-for-access document, results in presentation of at least a portion of the corresponding Missouri Bar article 411 on Durables Powers of Attorney within a document display region 410 of interface 400 in FIG. 4.

Depending on the access rights of the user and whether the selected content is a pay-for-access document or a non-pay-for access document, the user account is charged a fee for accessing the primary search results. Some embodiments present an advisory message to the user regarding any assessment of fees, providing users an option to cancel access prior to assessment of any applicable fees. (Some embodiments may require the user to enter a password and username or account information as a prerequisite to accessing documents from a pay-for-access database, whereas as other may perform user authentication transparently.

Figure 4:
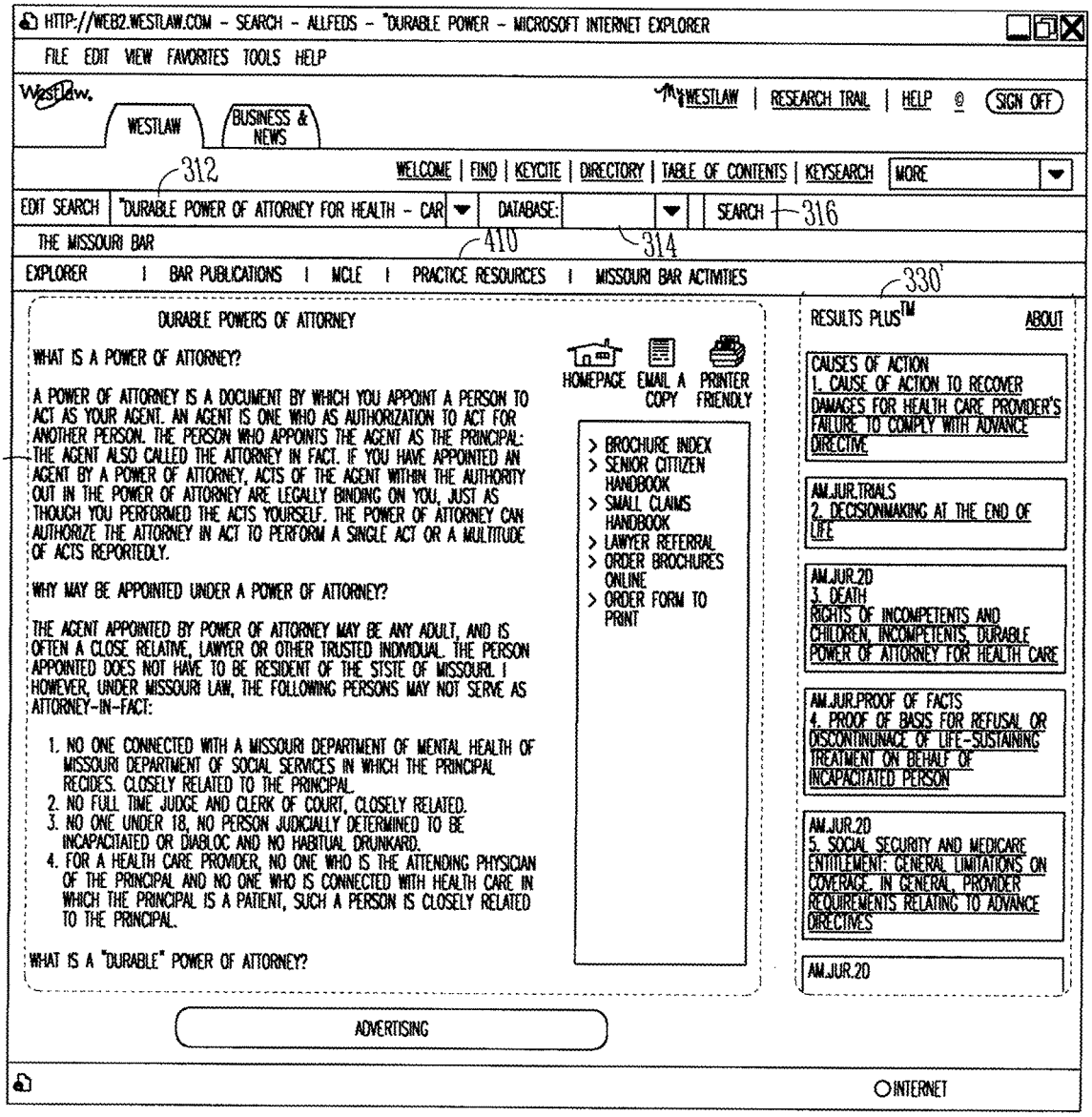
FIG. 4 is a facsimile of an exemplary user interface 400 corresponding to one or more embodiments of the invention.

Additionally, the exemplary embodiment responds to the selection of one of the primary documents by updating the secondary search results. The update in one instance entails re-ranking all or a subset of the current secondary search results based on their similarity to the selected document. In FIG. 4, the secondary results region is designated 330' to signify the change from region 330 in FIG. 3. However, in other instances, the update may entail executing a new secondary database query using a "more like this" methodology.

Moreover, some embodiments present the primary and secondary results in categorical clusters corresponding in some instances to their data sources. For example, some embodiments, group all blogs together in rank order of relevance, independently of other types results. Some embodiments anticipate the selection of one or more of the non-pay-for-access results to reduce user-perceived latency in retrieving or displaying such documents.

In some embodiments, the user interface is configured so that the user can query a vertical collection of the open web content—for example a legal, financial, scientific, or health vertical—using a concept search engine that exploits word pairs and chains of word pairs. Additionally, the interface includes features which upon selection enabling the user to selectively filter search results based on category assignments or named entities associated with the documents. Additional content, such as advertisements, related documents from federated databases, or other information products can be served up to the user, based on the concepts, category assignments, or named entities.

CONCLUSION

In furtherance of the art, the inventors have presented various exemplary systems, methods, and software which, among other things, facilitate the supplementation of search results with additional information. One exemplary system automatically searches for and identifies open web documents in response to queries within a subscription-based system and/or automatically searches for and identifies pay-for-access content in response to receiving open web queries.

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. A non-transitory machine-readable medium for use in operating an online pay-for-access legal research system, the medium comprising instructions that when executed by a computer cause the computer to perform the steps of:

receiving a user query for one of pay-for-access data and non-pay-for-access data, receiving a signal representing a user selection of a primary database, and automatically identifying a set of primary documents based on the received user query and the selected primary database;

providing a data structure comprising a set of data fields, the set of data fields comprising a first data field having a default value governing whether supplemental searching is enabled or disabled when searching select databases, a second data field including a listing of one or more URLs defining a set of one or more non-pay-for-access databases, and a third data field including a default value governing presentation of supplemental search results, a fourth data field having a default value governing which among two or more secondary search algorithms or acceptance criteria are used during secondary searching, and a fifth data field having one or more values governing the presentation of advertising in search results;

determining, by use of the data structure, the user query is for pay-for-access data and upon such determination:
determining, by use of the data structure, at least one non-pay-for-access database based in part on the selected primary database and automatically identifying in the at least one non-pay-for-access database a first set of secondary documents based on the received user query; and
responding to the received user query by outputting search results that include pay-for-access data from the set of primary documents from the primary database and non-pay-for access data from the first set of secondary documents from the at least one non-pay-for-access database;

determining, by use of the data structure, the user query is for non-pay-for-access data and upon such determination:
determining, by use of the data structure, at least one pay-for-access database based in part on the selected primary database and automatically identifying in the at least one pay-for-access database a second set of secondary documents based on the received user query; and
responding to the received user query by outputting search results that include pay-for-access data from the second set of secondary documents or search results from the at least one pay-for-access database, and non-pay-for-access data from the primary set of documents from the primary database;

presenting, by use of the data structure, the search results including the pay-for-access data and the non-pay-for-access data as separate graphical user interface elements in a graphical user interface, positioning the separate graphical user interface elements within the graphical user interface to provide an indication as to a data source and a data type for data in each of the separate graphical user interface elements and an indication as to an association between the pay-for-access data and the non-pay-for-access data in the separate graphical user interface elements; and wherein both the pay-for-access data and the non-pay-for-access data represent content related to the received user query.

2. The machine-readable medium of claim 1, wherein the medium comprises instructions for conducting a concept search based on word pairs in the user query.

3. The machine-readable medium of claim 1:
wherein the received user query is associated with a user who has an account with the online pay-for-access research system; and
wherein the medium further comprises instructions for outputting one or more third-party advertisements in association with the non-pay-for-access data, with one or more of the third-party advertisements selected based on identity of the user.

4. A server for an online pay-for-access legal research system, the server comprising a processor, a memory, and instructions stored on the memory and adapted for execution by the processor, the server further comprising:

a primary search module adapted to receive a user query for one of pay-for-access data and non-pay-for-access data and receive a signal representing a user selection of a primary database, and automatically identify a set of primary documents based on the received user query and the selected primary database;

a data structure comprising a set of data fields, the set of data fields comprising a first data field having a default value governing whether supplemental searching is enabled or disabled when searching select databases, a second data field including a listing of one or more URLs defining a set of one or more non-pay-for-access databases, and a third data field including a default value governing presentation of supplemental search results, a fourth data field having a default value governing which among two or more secondary search algorithms or acceptance criteria are used during secondary searching, and a fifth data field having one or more values governing the presentation of advertising in search results;

determining, by use of the data structure, the user query is for pay-for-access data and upon such determination:
a secondary search module adapted to determine at least one non-pay-for-access database based in part on the selected primary database and automatically identify a first set of secondary documents in the at least one non-pay-for-access database based on the received user query;
a user interface module adapted to output, responsive to the received user query, search results that include pay-for-access data from the set of primary documents from the primary database and non-pay-for-access data from the first set of secondary documents from the at least one non-pay-for-access database;

determining, by use of the data structure, the user query is for non-pay-for-access data and upon such determination:
the secondary search module further adapted to determine at least one pay-for-access database based in part on the selected primary database and automatically identify a second set of secondary documents in the at least one pay-for-access database based on the received user query; and
the user interface module further adapted to output, responsive to the received user query, search results that include pay-for-access data from the second set of secondary documents from the at least one payfor-access database and non-pay-for-access data from the primary set of documents from the primary database;

the user interface module further adapted to output the search results including the pay-for-access data and the non-pay-for-access data as separate graphical user interface elements in a graphical user interface, separate graphical user interface elements within the graphical user interface providing an indication as to a data source and a data type for data in each of the separate graphical user interface elements and providing an indication as to an association between the pay-for-access data and the non-pay-for-access data in the separate graphical user interface elements; and wherein both the pay-for-access data and the non-pay-for-access data represent content related to the received user query.

5. The server of claim 4:

wherein the search results identify one or more pay-for-access documents, and wherein the user interface module is adapted to receive a user request to display one of the pay-for-access documents;

wherein a subscriber database module is adapted to provide for user access to one of the pay-for-access documents without requiring the user to input authentication credentials in response to the received user request; and wherein the user interface module is adapted to display the one of the pay-for- access documents in response to authentication of the user by the subscriber database module.

6. The server of claim 4, wherein the search results are determined using a concept search based on word pairs in the user query.

7. The server of claim 4, wherein the received user query is associated with a user account in a user account database in the online pay-for-access legal research system; and wherein the server further comprises an ad module adapted to output one or more third-party advertisements in association with the non-pay-for-access data, with one or more of the third-party advertisements selected based on the user account.

8. The server of claim 7, wherein the ad module is further adapted to in response to the user clicking on the one third-party advertisement, receive a payment from a sponsor of the one third-party advertisement a click through fee with a portion of the click-through fee to be shared with an entity that owns the online legal research system or advertising rights associated with the online legal research system.

9. The server of claim 7, wherein the one or more of the third-party advertisements are directed to a legal-industry product or service.

10. The server of claim 9, wherein the user account associated with the received user query is associated with a particular legal specialty, and the legal-industry product or service are directed to a legal specialty different from the particular legal specialty.

* * * * *